United States Patent
Dlugos et al.

[11] Patent Number: 5,878,379
[45] Date of Patent: Mar. 2, 1999

[54] COARSE VOLUME MEASUREMENT WITH INTERLOCK

[75] Inventors: Daniel F. Dlugos, Shelton; Seymour Feinland, Stamford, both of Conn.

[73] Assignee: Pitney Bowes Inc., Stamford, Conn.

[21] Appl. No.: 775,851

[22] Filed: Dec. 31, 1996

[51] Int. Cl.⁶ .............................. G01B 7/00; G01G 19/00
[52] U.S. Cl. ...................... 702/156; 702/152; 702/159; 702/173; 367/99
[58] Field of Search ..................................... 364/567, 568, 364/550, 560–566, 556; 356/380, 383, 386; 705/401, 402, 406, 407, 414, 152; 367/99; 702/156–159, 173

[56] References Cited

U.S. PATENT DOCUMENTS

| | | | |
|---|---|---|---|
| 2,689,082 | 9/1954 | Kolisch | 364/564 |
| 2,708,368 | 5/1955 | Kolisch | 73/432 |
| 4,268,967 | 5/1981 | Brana et al. | 33/548 |
| 4,270,173 | 5/1981 | Suttler | 364/564 |
| 4,773,029 | 9/1988 | Claesson et al. | 364/562 |
| 5,105,392 | 4/1992 | Stringer et al. | 367/99 |
| 5,175,595 | 12/1992 | Fukase | 356/387 |
| 5,220,536 | 6/1993 | Stringer et al. | 364/565 |
| 5,266,810 | 11/1993 | Murphy | 250/560 |
| 5,528,517 | 6/1996 | Loken | 364/564 |

*Primary Examiner*—John Barlow
*Assistant Examiner*—Bryan Bui
*Attorney, Agent, or Firm*—Melvin Scolnick; Charles Malandra, Jr.

[57] ABSTRACT

A dimensional weighing apparatus is disclosed which has a weighing scale for determining the actual weight of a carton placed thereon, and associated therewith is a measuring frame and an optical sensing system for measuring the linear distance of the three axes of carton positioned on the scale necessary to determine the volume of the carton. A computer processing unit determines firstly whether the actual volume of the carton is less or greater than a predetermined threshold volume, and provides an operator with a signal indicating that determination. The apparatus includes means for permitting the operator to determine whether he will manually measure the carton to determine its actual volume for a more accurate determination than is provided by the measuring frame and optical sensing system, or if he will cause the dimensional weighing apparatus to calculate the dimensional weight of the carton and determine a shipping weight based thereon, thereby accepting a less accurate determination of a shipping weight in the interest of greater speed.

19 Claims, 5 Drawing Sheets

COARSE VOLUME MEASUREMENT WITH INTERLOCK

RELATED APPLICATIONS

Reference is made to application Ser. No. 5,770,850 and now U.S. Pat. No 5,770,864 issued Jun. 23, 1998 to Dlugos, entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672, entitled METHOD FOR DIMENSIONAL WEIGHING UTILIZING POINT DETERMINATION, assigned to the assignee of this application and filed on even date herewith.

Reference is made to application Ser. No. 08/775,673, entitled METHOD FOR DIMENSIONAL WEIGHING UTILIZING SPACED LINE PROJECTION, assigned to the assignee of this application and filed on even date herewith.

Reference is made to application Ser. No. 08/775,671, entitled METHOD FOR DIMENSIONAL WEIGHING WITH OPTICS, assigned to the assignee of this application and filed on even date herewith.

Reference is made to application Ser. No. 08/775,549, entitled LOW COST DIMENSIONAL DETERMINING SYSTEM, assigned to the assignee of this application and filed on even date herewith.

Reference is made to application Ser. No. 08/775,675, entitled AUTOMATIC DIMENSIONAL WEIGHING, assigned to the assignee of this application and filed on even date herewith.

Reference is made to application Ser. No. 08/775,550, entitled DIMENSIONAL WEIGHING UTILIZING A FOLLOWING ARM MECHANISM, assigned to the assignee of this application and filed on even date herewith.

Reference is made to application Ser. No. 08/775,214, entitled DIMENSIONAL WEIGHING UTILIZING A LINEAR DISPLACEMENT TRANSDUCER, assigned to the assignee of this application and filed on even date herewith.

Reference is made to application Ser. No. 08/775,213, and now U.S. Pat. No. 5,734,476 issued Mar. 31, 1998 Dlugos, entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674, and now U.S. Pat. No. 5,777,746 issued Jul. 7, 1998 to Dlugos, entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The present invention relates generally to the concept of dimensional weighing to determine the charge required by a carrier for transporting a package or parcel, and more particularly to a dimensional weighing system suitable for use by a variety of shippers and carriers to determine accurate freight charges for packages or parcels that are considerably oversized in comparison to their actual weight.

A detailed description of the background and development of the concept of dimensional weighing, as well as the significant problems and disadvantages of prior art dimensional weighing systems, is set forth in the Background of the Invention portion of the specification in the above cross-referenced application, which is hereby incorporated herein by reference.

Briefly, the invention disclosed and claimed in that application is a dimensional weighing system in which a measuring frame having three measuring arms which extend from a common juncture along the three axes of cartons which must be measured to determine the volume thereof is mounted in operative association with the platform of a weighing scale on which the cartons are placed in a predetermined position. A plurality of optical emitters, such as LEDs, are evenly positioned along the length of the measuring arms, and either one or three optical sensors, depending on the particular embodiment of the invention, are positioned such that the sensor(s) respond to all emitters on the measuring arms that are not obscured by the parcel. A computer processing means receives and stores the length, width and height linear dimensions of a carton from the optical sensors and calculates its volume. The computer then compares that volume with a predetermined threshold volume stored in a memory, so as to determine, firstly, whether the volume of the carton is less than the predetermined threshold volume so that it can be shipped at a shipping charge based on the actual weight of the carton as determined by a suitable weighing scale, or is larger than the predetermined threshold volume and may therefore require that a dimensional weight be calculated on which a shipping charge is based. If the latter situation prevails, the computer processing means then compares the dimensional weight of the carton with the actual weight to determine which is larger to ensure than the shipping charge is based on the proper weight.

One problem which became evident with the dimensional weighing system described and claimed in the above cross-referenced application is that the optical measuring portion of the apparatus requires a substantially large volume of unobstructed space surrounding the package or parcel being measured because of the distance which the optical sensor or sensors, as the case may be, must be spaced from the measuring arms in order for the emitters not obscured by the carton being measured to be exposed to the sensors and not lie in a "shadow" of the carton relative to the location of the sensor(s). Thus, with respect to the embodiment utilizing only one sensor, this required that the sensor be located at or near to the diagonally opposite corner of the package, i.e., as far out horizontally from the juncture of the measuring arms as the length of these arms, and as far up vertically from the juncture of the measuring arms as the height of the vertical measuring arm. With respect to the embodiment utilizing three sensors, the sensor for the vertical measurement along the vertical arms must still be in the same location as that just described for a single sensor, and the sensors for the two horizontal measuring arms must be located in the same plane as the measuring arms and as far out from the free end of each measuring arm as the length thereof.

In either of the foregoing situations, the problem that arose was that it was often difficult for an operator to place a carton on the platform of the weighing scale, especially if the size of the carton approximated that of the full length of the measuring arms, because of the presence of the first mentioned sensor located adjacent to the diagonally opposite corner of the carton from the juncture of the measuring arms. Depending on the size of the carton, the presence of the sensor in this location made it very awkward or cumbersome to position the carton on the scale platform without inadvertently striking the sensor or one of the horizontal meaning arms, or dropping the carton on the scale platform or inaccurately positioning it thereon. This problem was often further complicated by the presence of supporting structure for the sensor, regardless of whether the supporting structure for the sensor was mounted on the same base as the scale and measuring arms or was suspended from above, either of which only made positioning the carton more difficult. In the situation where there are three sensors, there is the added problem of ensuring that there is nothing lying in the plane of the horizontal measuring arms that might obstruct emitters beyond the dimensions of the carton from the two sensors measuring along the horizontal measuring arms, such as, for example, the operator's hands or arms.

In view of the fact that the speed with which an operator can dimensionally weigh successive packages or cartons with the dimensional weighing apparatus is a significant factor in ensuring that the apparatus is economically viable, it becomes extremely important to enable the operator to place packages or cartons on the weighing scale platform, and remove them therefrom, as rapidly and as accurately as possible, so as to maintain a high through put rate and do so without risk of damage to the apparatus which could lead to down time to allow for necessary repairs.

Another problem which became evident with the invention disclosed in the above cross-referenced application was that the cost of the apparatus was relatively high because of the need for a large number of LED emitters that were required to obtain a high degree of accuracy in measuring the linear dimensions of packages and cartons. The resolution of the measuring apparatus depends on the spacing of the emitters, and the closer together the emitters are placed along the measuring arms, the more accurate the measurements will be. Thus, to determine an accurate volume for a carton it may be necessary to provide emitters along the measuring arms that are only one quarter to one half inch apart. Further, a large number of emitters requires more complex computer control components, which further adds to the cost.

Still another problem which became evident with the previous invention was that it did not have the capability of providing a preliminary indication of whether or not it was necessary to dimensionally weigh a carton based on a rough calculation of the volume of the carton, a feature which could greatly reduce the cost of the dimensional weighing apparatus. It has been found from experience that only about 20% of the packages and parcels handled by a carrier in a given period of time actually require dimensional weighing in order to determine a proper shipping charge based on a dimensional weight, whereas a proper shipping charge can be based on the actual weight of the packages and parcels for the other 80%. This presents the problem that, not only is the dimensional weighing apparatus relatively expensive in the first place, but also it is effectively utilized for only about 20% of the packages and parcels being shipped. Thus, while the apparatus of the prior invention may be cost effective for a large carrier or shipper, e.g., UPS, Federal Express, etc., or catalog merchandise mail order businesses, it is often not cost effective for small to medium carriers or shippers.

Thus, there is a need for a dimensional weighing apparatus which is sufficiently economical to be cost effective for small to medium size carriers and shippers and yet which provides sufficient accuracy in determining the volume of a carton that the degree of error from making rough calculations is economically acceptable. Also, it is desirable that a low cost dimensional weighing apparatus ideally suited to small and medium volume shippers have the capability of providing a preliminary indication of whether it is necessary to dimensionally weigh a particular carton based on a rough calculation of the its volume, so that the operator then has a choice of permitting the dimensional weighing apparatus to calculate a rough shipping weight on which the shipping system will calculate the shipping charge, or of manually taking accurate measurements of the carton to accurately determine a dimensional shipping weight on which an accurate shipping charge can be calculated.

SUMMARY OF THE INVENTION

The foregoing shortcomings and disadvantages of the dimensional weighing apparatus disclosed and claimed in the above cross-referenced application are largely obviated, if not entirely eliminated, by the dimensional weighing apparatus of the present invention. More specifically, the apparatus of the present invention provides an optical measuring system in which the LED emitters and the sensors therefor are both located on the measuring arms so that the space normally occupied by a package or carton of any size up to the maximum which the dimensional weighing apparatus can accommodate is entirely free of any obstructing or interfering structure, thereby removing all impediments to rapidly and accurately placing cartons on the platform of the weighing scale. In addition, the apparatus of the present invention provides a system in which a rough calculation of the volume of a carton is made, on the basis of which a signal is given to an operator indicating whether or not it is necessary to dimensionally weigh the carton, and if so, the apparatus will provide an approximate shipping weight based on the rough calculations or the operator can manually determine the precise volume to calculate a dimensional weight for determination of an appropriate shipping charge based thereon.

In its broader aspects, the dimensional weighing apparatus of the present invention is adapted for use with a shipping system which determines an appropriate shipping charge for packages and parcels based on an appropriate shipping weight as determined by the dimensional weighing apparatus. Within this environment, the dimensional weighing apparatus comprises means defining a supporting surface, a weighing scale mounted on the supporting surface and having a platform on which cartons are placed for determining the weight of the cartons, and a measuring frame operatively associated with the supporting surface. There is means operatively associated with the measuring frame for measuring the linear distance of the length, width and height of a carton placed on the platform. There is a computer processing means responsive to operation of the weighing scale and the measuring means for determining whether the actual volume of the carton is greater or less than a predetermined threshold volume stored in a memory and for providing an indication thereof, the computer processing means further including selectively operable means for determining a shipping weight of said carton by calculating the dimensional weight thereof and comparing the dimensional weight with the actual weight to determine which of the weights is the larger, whereby the operator of the dimensional weighing apparatus can make a selection as to whether or not the carton should be dimensionally weighed in the first instance and if so, whether the dimensional weighing apparatus should perform this function or said operator should use other means to measure the carton for determination of the actual volume and for the purpose of determining the dimensional weight thereof.

In some of its more limited aspects, the weighing scale includes means defining a reference point for cartons disposed on the platform of the weighing scale for positioning cartons in a predetermined location relative to the measuring frame such that the surfaces of the cartons adjacent the measuring frame are disposed in spaced relationship therewith. The means defining the reference point comprises guide means mounted on the platform in spaced parallel relationship with the measuring arms for ensuring that the surfaces of cartons disposed on the platform in the predetermined location are disposed in evenly spaced parallel relationship with the measuring arms. The measuring frame includes a plurality of elongate measuring arms extending from a juncture of the measuring arms disposed adjacent to the reference point along the two horizontal axes of cartons and the vertical axis thereof, the juncture of said measuring arms being disposed in closely spaced relationship with the reference point.

The means for measuring the linear distance of the length, width and height of a carton disposed on the platform comprises optical sensing means associated with each of the measuring arms for determining the extent to which each of the adjacent surfaces of a carton disposed on the platform extends along the adjacent measuring arm. The optical sensing means comprises a plurality of optical emitter/sensor units mounted on the measuring arms in evenly spaced relationship therealong, each unit having an optical emitter and a photosensor mounted adjacent to each other such that the photosensor can detect light from the emitter which is reflected by an adjacent surface to the photosensor.

The computer processing means for determining the shipping weight of a carton includes a central processing unit having means for determining whether or not the volume of a carton exceeds a predetermined threshold volume below which the central processing unit determines a shipping weight based on the weight of the carton as determined by the weighing scale, and at or above which the dimensional weighing apparatus calculates a shipping weight based on the volume of the carton independent of the weight thereof as determined by the weighing scale. To accomplish this, the computer processing means also includes a memory storage means for storing the predetermined threshold volume, memory storage means for storing the individual linear dimensions of the length, width and height of a carton disposed on the platform, means for calculating the volume of the carton based on the linear dimensions, and means for comparing the calculated volume of the carton with the predetermined threshold volume to determine which is the larger. The computer processing means includes an indicating device which provides the operator of the dimensional weighing apparatus with an indication of which of these volumes is the larger, so that he can make a selection as to whether or not the carton should be dimensionally weighed in the first instance, and if so, whether the dimensional weighing apparatus should perform this function or he should manually measure the carton for determination of the actual volume and manually calculate the dimensional weight thereof.

The computer processing means further includes a memory storage means for storing a dimensional weight constant in terms of cubic units per unit of weight, means for calculating a dimensional weight by dividing the actual volume of the carton by the dimensional weight constant, and means for comparing the actual weight with the calculated dimensional weight to determine which is the larger, which is the shipping weight on which the shipping system determines an appropriate shipping charge.

The computer processing means further includes a means for calculating two actual volumes of the carton based on measured dimensions and one linear unit of reduced dimensions, and for then calculating two dimensional weights from the two volumes, and for using either the higher or the lower or an average, depending on the manner in which the computer processing means is programmed, to determining an appropriate shipping weight for the carton.

Having briefly described the general nature of the present invention, it is a principal object thereof to provide a dimensional weighing apparatus which has advantageous features of accuracy, simplicity, convenience, reliability and speed of operation, and economy of manufacture, installation and operation not heretofore encountered in prior art dimensional weighing apparatus.

Another object of the present invention is to provide a dimensional weighing apparatus which provides a preliminary indication of whether or not it is necessary to calculate a shipping weight based on the volume of a carton by determining whether that volume is greater or less than a predetermined threshold volume.

Still another object of the present invention is to provide a dimensional weighing apparatus which is selectively operable under the control of the operator to determine a shipping weight for a carton based on whether the actual weight of a carton is less than or exceeds a calculated dimensional weight thereof, or merely provide the operator with an indication of whether the volume of the carton is greater or less than a predetermined threshold volume so that the operator can then manually measure the volume and calculate a shipping weight therefor based on a predetermined dimensional weight constant.

A still further object of the present invention is to provide a dimensional weighing apparatus which can automatically calculate two actual volumes for a carton, one based on actual measurements and the other based on a dimensions reduced from the actual measurements by one predetermined unit of distance, and then calculates two dimensional weights based on the two volumes to compare against the actual weight, in order to compensate for the rough calibration of the measuring apparatus.

These and other objects and features of the dimensional weighing apparatus of the present invention will be more apparent from a consideration of the following detailed description of presently preferred embodiments of the invention, when considered in conjunction with the accompanying drawings.

DETAILED DESCRIPTION OF THE PREFERRED EMBODIMENTS

Figure 1:
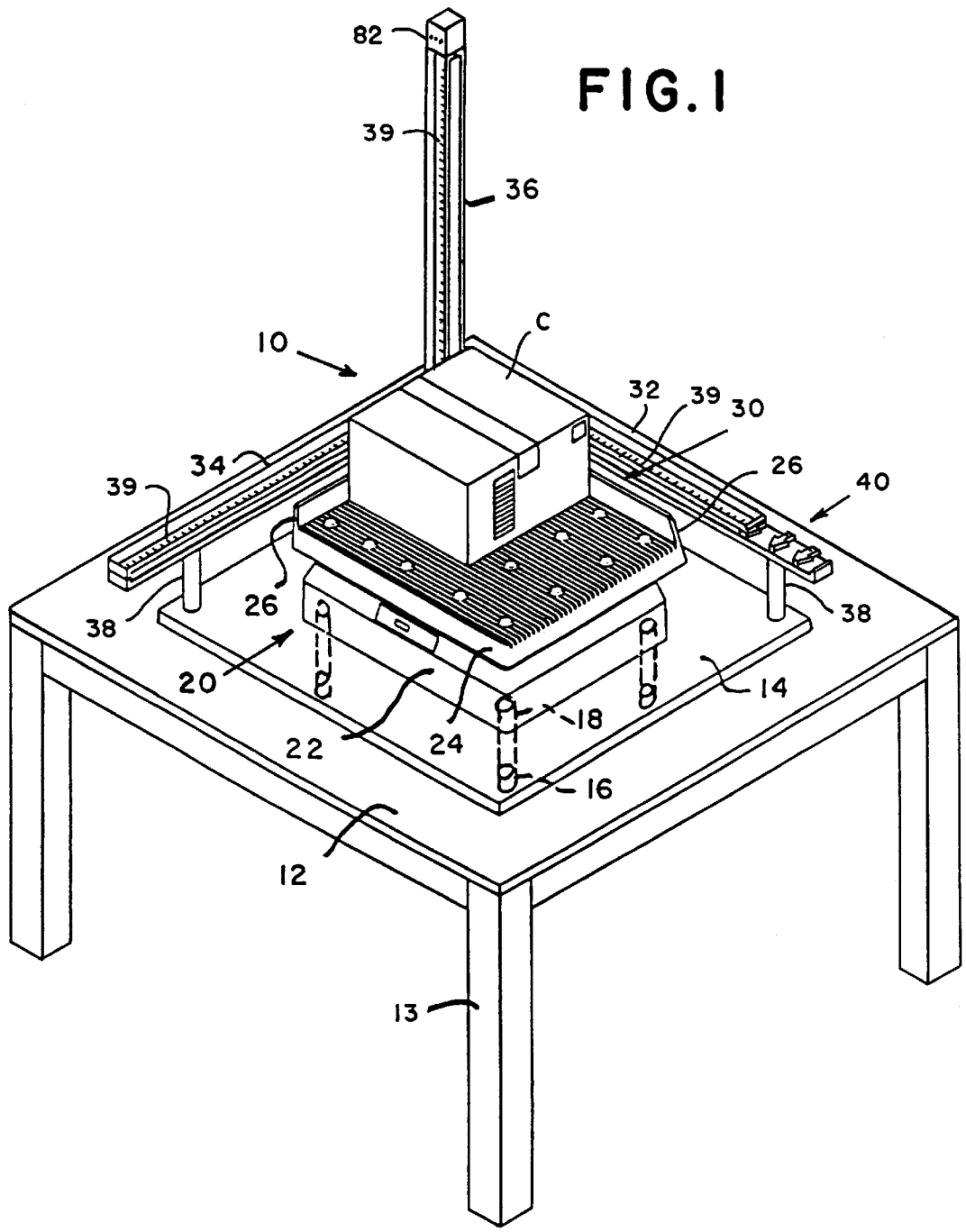
FIG. 1 is a perspective view of one embodiment of the dimensional weighing apparatus embodying the principles of the present invention, illustrating the relationship between a weighing scale with a carton thereon and a dimensional measuring frame.

Referring now to the drawings, and particularly to FIG. 1 thereof, the dimensional weighing apparatus of the present invention is indicated generally by the reference numeral 10. The apparatus 10 is mounted on and supported by any suitable horizontal surface, such as the surface 12 which is supported by the legs 13. It will, of course, be apparent, that any suitable support, such as a work bench, counter top, desk, etc., may be utilized. The apparatus 10 includes a base 14 which is adapted to rest on the surface 12 or other supporting surface, the base 14 having registration apertures 16 which receive registration feet 18 mounted on the bottom wall of a weighing scale, indicated generally by the reference numeral 20.

Figure 2:
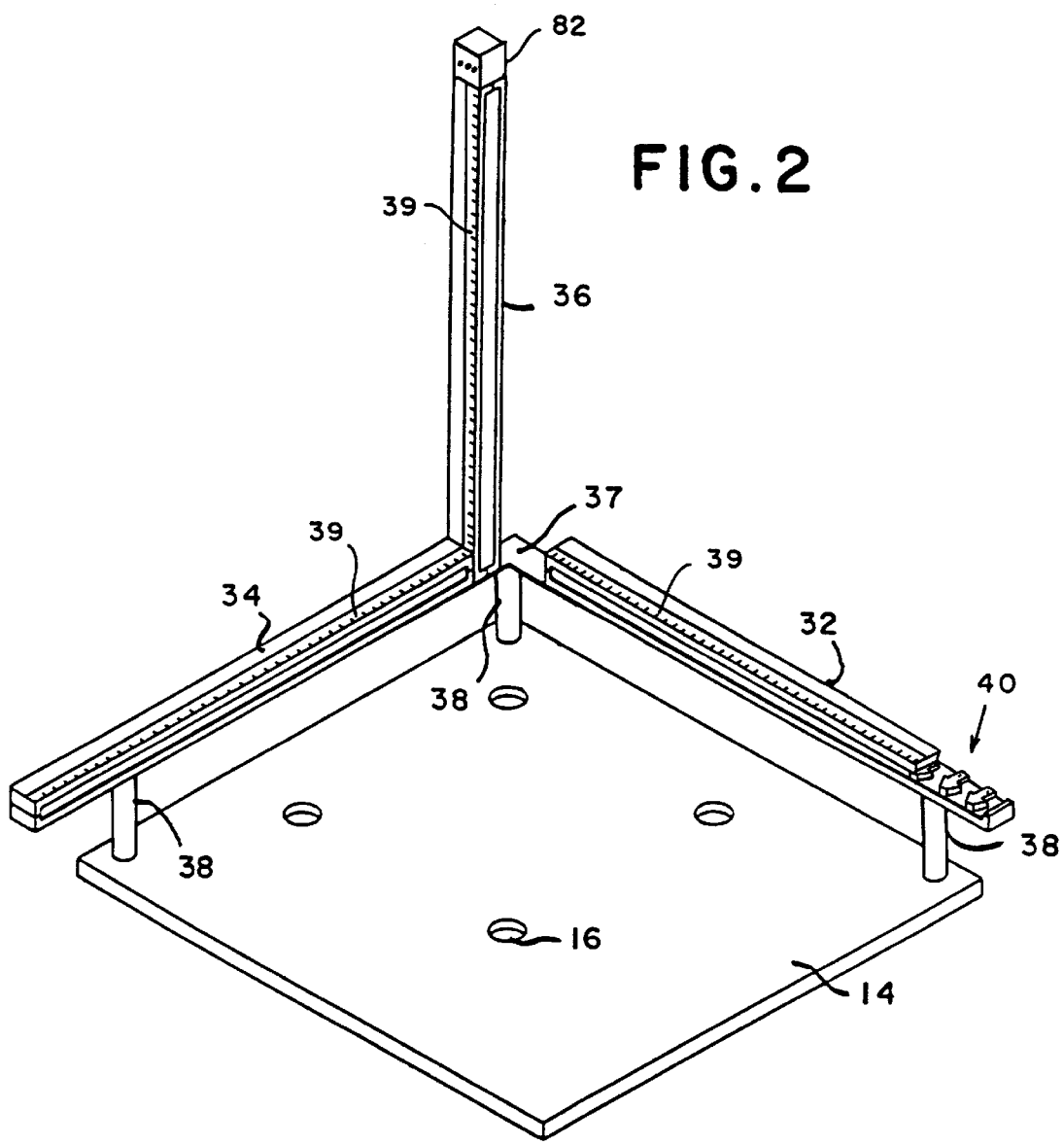
FIG. 2 is a view similar to FIG. 1, drawn to an enlarged scale, showing the dimensional weighing apparatus without the support, and with the scale and carton removed to reveal certain details.
Figure 3:
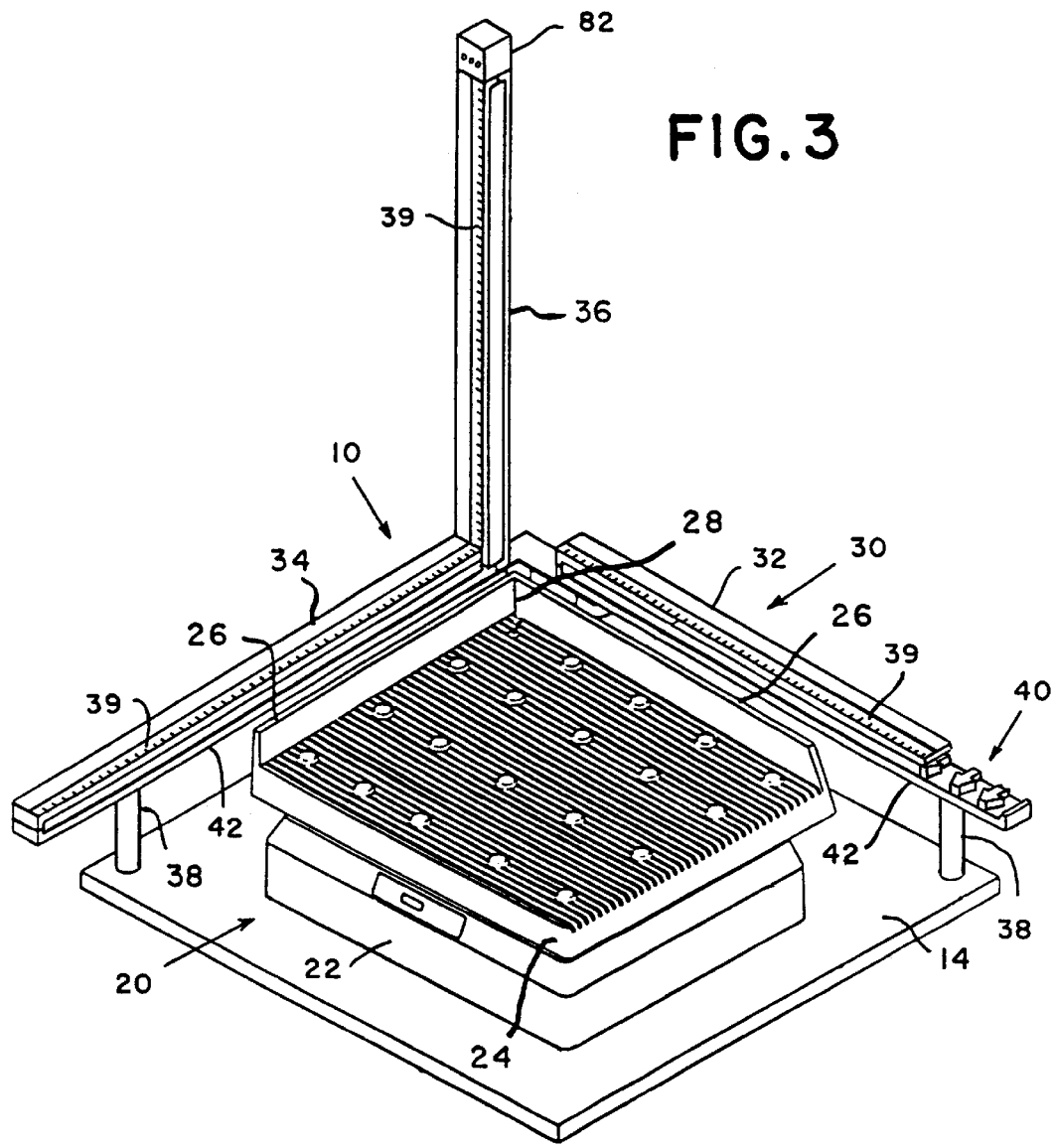
FIG. 3 is a view similar to FIG. 2, showing the dimensional weighing apparatus with the weighing scale in place.
Figure 4:
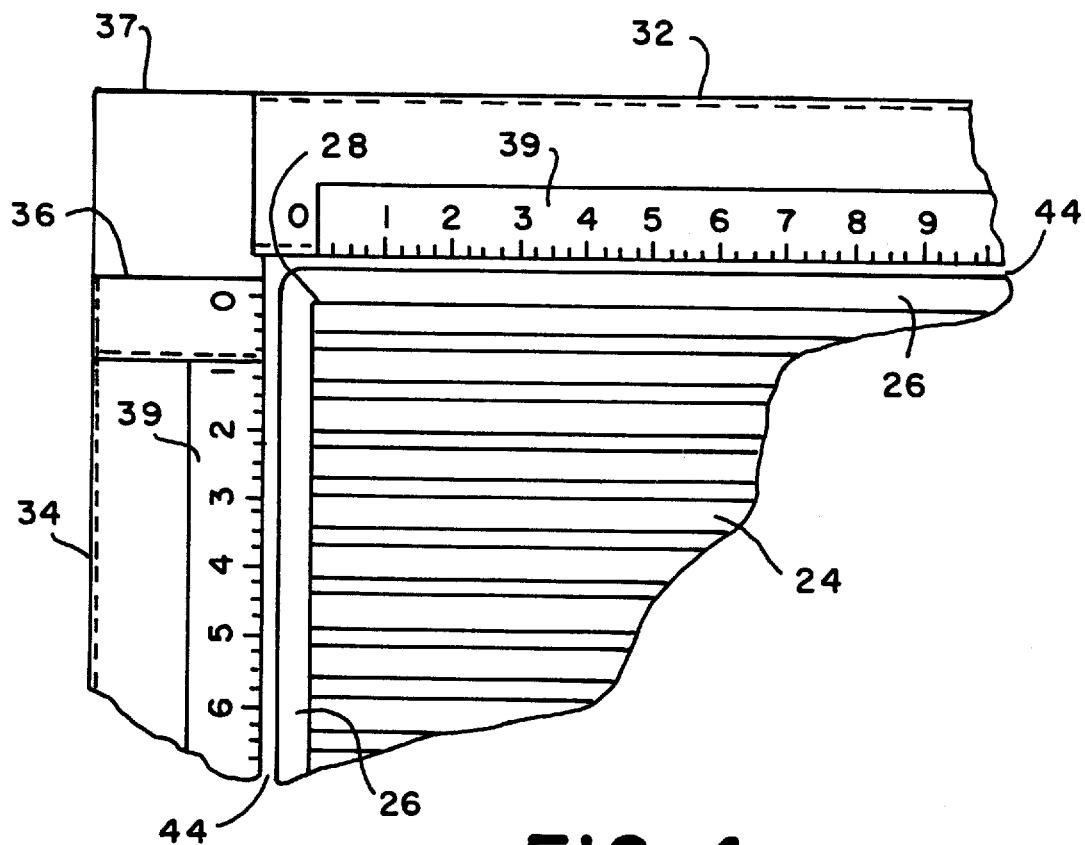
FIG. 4 is a fragmentary plan view of the apparatus shown in FIGS. 1, 2 and 3.

The weighing scale 20 includes a base unit 22 which houses all of the mechanical and electronic components of the scale 20 which are well known in the digital weighing art and need not be further described or shown herein for a full understanding of the present invention. The scale also includes a platform 24 which provides a surface on which cartons C to be weighed are placed. The platform 24 is provided with a pair of upstanding flanges 26 which constitute guides for ensuring that a carton is placed on the platform 24 in a precise predetermined location. As best seen in FIGS. 2 and 3, the adjacent ends of the upstanding flanges 26 form a reference point 28 for a lower rear corner of a carton placed on the platform 24, thereby establishing the aforementioned predetermined location, the significance of which will be made clear hereinbelow.

The dimensional weighing apparatus 10 further includes a linear measuring frame, indicated generally by the reference numeral 30 which includes three elongate measuring arms 32, 34 and 36, two of which, (32 and 34) are oriented in a horizontal plane and disposed perpendicular to each other so as to extend along the two horizontal axes of the carton C, the third (36) being vertically oriented to extend along the third axis of the carton C, thereby disposing the measuring arms 32, 34 and 36 so that they are in spaced parallel relationship with the adjacent surfaces of the carton C that represent the length, width and height of the carton C disposed on the platform 24. The horizontally oriented measuring arms 32 and 34 rest on an L-shaped base member 37 which is supported on the base 14 by a plurality of suitable posts 38 which are also secured to the base 14 so that, as seen in FIG. 3, the measuring arms 32 and 34 maintain a fixed spatial and parallel relationship with the upstanding flanges 26 of the scale platform 24. The vertically oriented measuring arm 36 also rests on the base member 37 adjacent the inner ends of the horizontal measuring arms 32 and 34. Although the preferred embodiment is shown as described above, it is possible, within the scope of the invention, to mount the L-shaped base member 37 and the measuring arms 32, 34 and 36 directly on the scale platform 24, in which case the weight of these parts becomes part of the tare weight of the scale. It will also be seen that each of the measuring arms 32, 34 and 36 includes a linear scale 39 with numbers representing a unit of linear measurement, for example, an inch or two, preferable the latter as will be more fully described hereinbelow.

Figure 5:
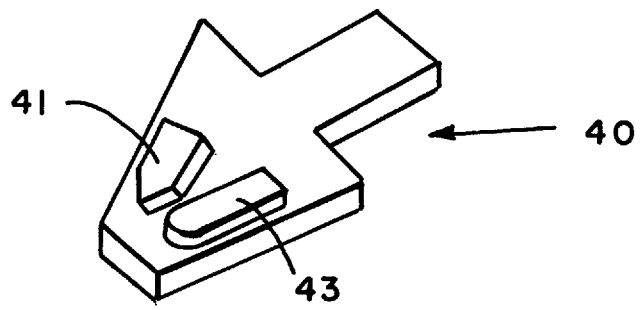
FIG. 5 is a view drawn to an enlarged scale of the details of one of the emitter/sensor units shown in FIGS. 1, 2 and 3.

There is a means operatively associated with the measuring frame 30 for measuring the linear distance of the length, width and height of a carton disposed on the platform 24. Referring particularly to FIGS. 1, 2 and 3, this means comprises an optical sensing system which includes a plurality of any suitable form of optical emitter/sensor units designated generally by the reference numeral 40. As best seen in FIG. 5, the emitter/sensor units 40 each comprise an emitter 41 and a photosensor 43, and are disposed on each of the measuring arms 32, 34 and 36 in uniformly closely spaced relationship along substantially the entire length of the measuring arms 32, 34 and 36. In each unit 40, the emitter 41 and the sensor 43 are disposed adjacent and at an angle to one another such that light from the emitter 41 can be reflected from an adjacent surface back to the photosensor 43 to activate the photosensor in a manner well known in the art. Thus, in a practical arrangement, the emitter/sensor units 40 are each spaced about two inches apart, although this spacing can be changed to accommodate any degree of accuracy that is desired in a particular installation.

As best seen in FIG. 3, the horizontal measuring arms 32 and 34 are mounted on the base 14 and appropriately dimensioned such that the innermost edges 42 of the se arms are in spaced parallel relationship with the adjacent edges of the upstanding flanges 26 on the platform 24, thereby leaving a relatively small clearance space 44 between these edges. This arrangement ensures, firstly, that the carton does not contact any portion of the measuring apparatus that could tend to support any of the weight of the carton, which would adversely affect the operation of the scale 20 in determining an accurate weight, and secondly that neither an edge corner nor side surface of a carton can contact and damage any of the emitter/sensor units 40 in the event of rough handling in placing cartons on the scale platform 2 4 or removing them therefrom. In addition, the clearance space 44 is necessary to provide a sufficiently long illumination path so that illumination from the emitters 41 transmitted to the face of a carton will be reflected therefrom back to the adjacent sensor units 43. Again, the p referred embodiment is shown as described above, but if the measuring arms 32, 34 and 36 are mounted directly on the scale platform, the upstanding flanges 26 can be eliminated since the measuring arms themselves would perform the function of the upstanding flanges.

Figure 6:
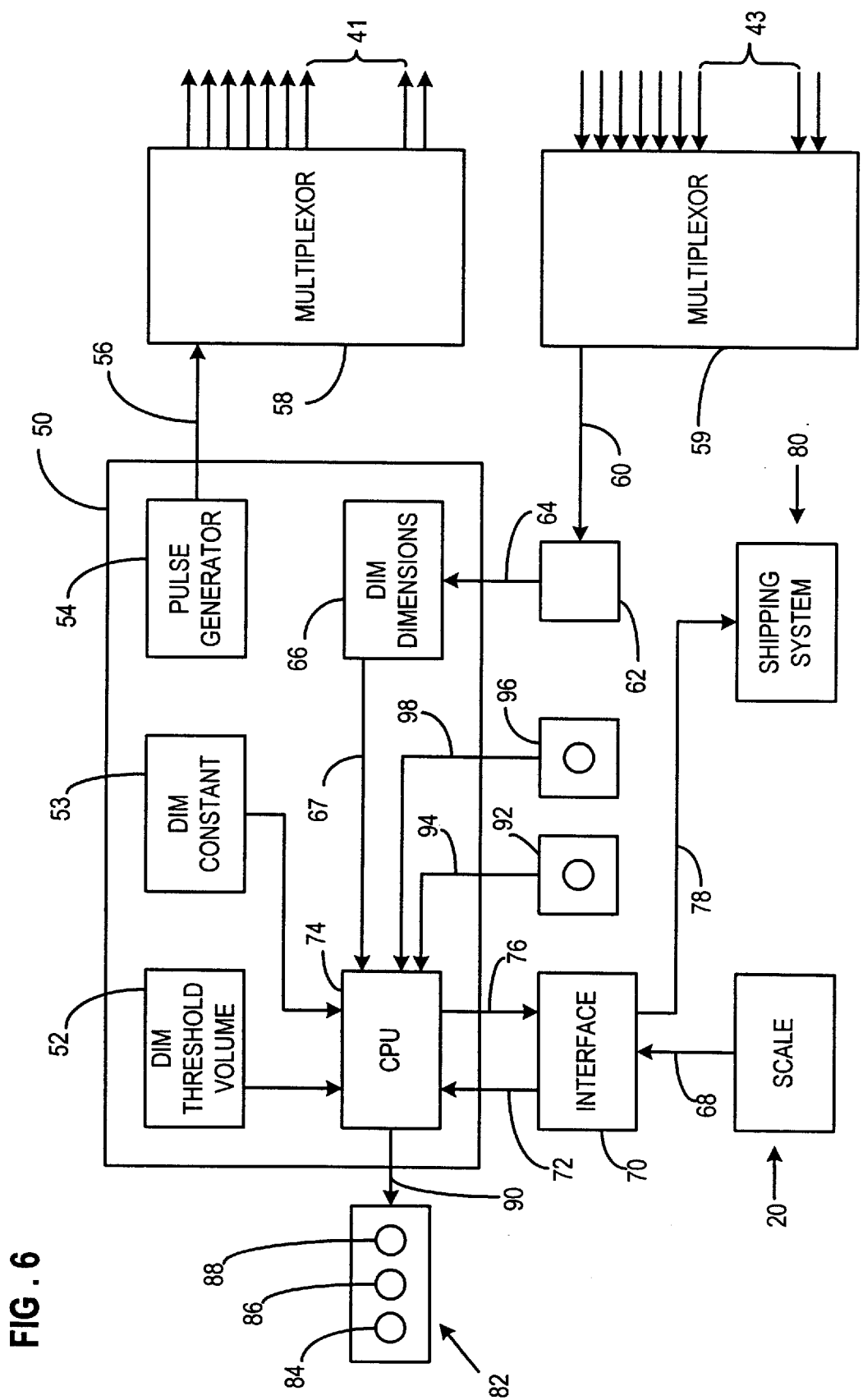
FIG. 6 is a schematic diagram of the major components of the electronic control system for the dimensional weighing apparatus of the present invention.

FIG. 6 illustrates schematically the major components of an electronic control system for controlling the operation of the previously described apparatus and for determining a shipping weight for a carton C disposed on the scale based on converting the actual or dimensional weight, as the case may be, of a carton into a shipping weight which is transferred to a shipping system which converts that weight into an appropriate shipping charge. It should be understood that the specific components described and shown herein are illustrative of the type of components required to perform the functions which are carried out by the apparatus of the present invention, and that other specific components may be utilized to achieve these functions.

The electronic control system includes a computer processing means 50 having a central processing unit which controls the operation of the apparatus 10 for determining the linear dimensions of a carton on the platform 24, calculating the volume thereof, comparing that volume with a predetermined threshold volume, calculating a dimensional weight for the carton and determining a shipping weight based on whether the dimensional weight is greater or less than the actual weight as determined by the scale 20.

Thus, the computer processing means 50 includes a first settable memory storage device 52 which stores a predetermined threshold volume that represents the volume of a carton, typically in the order of one cubic foot regardless of actual dimensions, below which the shipping weight would be calculated on the basis of the actual weight of the carton, and above which the shipping weight would be calculated on the basis of the dimensional weight of the carton. The computer also a includes a second settable memory storage device 53 which stores a variable dimensional weight constant, the amount of which can depend on the preference of a particular carrier, and which is used for converting the actual volume of a carton into a calculated dimensional weight. For the purpose of this determination, dimensional weight is defined as the cubic volume per unit of weight, the actual amounts depending on whether measurements are made using the English or metric measuring systems; for example, the constants generally adopted in the United States for the dimensional weight of cartons for shipping weight purposes is 194 cubic inches per pound for domestic service and 166 cubic inches per pound for international service. Alternatively, the memory storage devices 52 and 53 may store several predetermined threshold volumes and dimensional weight constants respectively to accommodate carriers which may use predetermined threshold volumes and dimensional weight constants other than those generally adopted, and also to accommodate both domestic and international service. In this situation, the memory storage devices 52 and 53 have suitable input controls by which the predetermined threshold volumes and dimensional weight constants are operator selectable for the specific carrier and/or particular class of service. Thus, once the actual volume of a carton is determined, that volume is divided by 194 or 166 respectively to determine the dimensional weight of the carton in pounds. The conversion of this dimensional weight into a shipping charge is further explained below.

The computer processing means 50 further includes a pulse generator 54 which produces a pulsing output signal through a line 56 to a multiplexor switch 58 which passes the signal to the emitter components 41 of the emitter/sensor units 40 in a rapid sequence so that only one emitter 41 is energized at a time. Preferably, the pulse generator 54 generates each pulse with a coded pulse pattern so that the sensor components 43 will sense only the light from the emitters 41 and not light from a spurious source when the surface of a carton is not adjacent an emitter/sensor unit 40.

The sensors 43 of the emitter/sensor units 40 which are adjacent to the surface of a carton respond to the light emitted by the emitters 41 and generate signals to another multiplexor switch 59, which is controlled by the computer processing means 50 through address lines in the same manner as is the multiplexor switch 58, which passes these signals in a proper order through a line 60 to a suitable amplifier 62 which amplifies the signal and directs it through a line 64 to a third memory storage device 66 in the computer 50 which temporarily stores the length, width and height linear dimensions of a carton as determined by emitter/sensor units 40 as further explained below. The computer processing means 50 has the capability of recognizing from which of the measuring arms 32, 34 or 36 a signal from the emitter/sensor units 40 originates, such as by pulsing only one measuring arm at a time, causing the pulse generator to alter the nature of the signals to each measuring arm to be unique, as well as other techniques, all of which are known in the art.

The weighing scale 20 is connected through a line 68 to an interface component 70, which in turn is connected through a line 72 to a central processing unit (CPU) 74 which is part of the computer processing means 50. The first memory storage device 52 and the third memory storage device 66 are also connected within the computer 50 to the CPU 74 so as to transmit the predetermined threshold volume and the linear dimension data from these memory storage devices respectively to the CPU 74. The CPU 74 has the capability of calculating the volume of the carton from the linear dimensions stored in the third memory storage device 66, and then comparing that volume with the predetermined threshold volume from the first memory storage device 52 to determine whether the actual volume is above or below the predetermined threshold volume. The CPU 74 also has the capability of determining the dimensional weight of the carton by dividing the calculated volume by the dimensional constant stored in the memory device 53, and then comparing the dimensional weight with the actual weight of the carton, as determined by the scale 20, to determine which of the two weights is the larger, which would be the shipping weight for that carton.

The CPU 74 further has the capability of sending a signal indicative of that weight via the lines 76 and 78 to a shipping system, designated generally by the reference numeral 80. The shipping system 80 is typically a rather complex processing system which forms no part of the present invention and therefore need not be described other than to mention that it would include a computer processing unit that would store individual carrier rates for different amounts of weight, carrier classes, destination zip codes, and other relevant information, and would respond to the incoming signal that is indicative of the shipping weight by determining an appropriate shipping charge for the carton. Alternatively, the length, width and height measurement data, along with other relevant data such as predetermined threshold volumes and dimensional weight constants, can, if desired, be transmitted to the shipping system either for determination purposes or for printing on a manifest. It should be noted that the computer processing means 50 and all of the components contained therein could be physically located in the shipping system 80 rather than with the dimensional weighing apparatus 10. It is only necessary for complete implementation of the present invention that the computer processing means 50 be operatively interconnected between the measuring frame 30 and the associated optical measuring means, on the one hand, and the shipping system 80 on the other, with the physical location of the computer 50 being a matter of choice.

In addition to the individual emitter/sensor optical sensing units 40 of the present invention, another significant difference between this invention and that of the above cross-referenced application is the inclusion of an indicating means for providing the operator of the dimensional weighing apparatus 10 with an indication of whether the actual volume of a carton is greater or less than the predetermined threshold volume stored in the memory storage device 52, and if greater, whether the dimensional weight of the carton as calculated from the linear measurements stored in the memory storage device 66 is greater or less than the actual weight as determined by the scale 20. The indicating means may be any form of device that produces an operator recognizable signal, such as a visual, audible or tactile, but, as best seen in FIG. 6, in the preferred mode the indicating means is a suitable visual indicating device designated generally by the reference numeral 82. The location of this device is optional, which may include a suitable control panel or other location on the apparatus 10 where it is readily visible to an operator, such as on top of the vertically oriented measuring arm 36 as seen in FIGS. 1, 2 and 3. The indicating device 82 includes a plurality of indicating lights, such as the red light 84, green light 86 and yellow light 88, to indicate whether the actual volume of a carton is over, under or at the predetermined threshold volume stored in the memory device 52, which, in turn, determines whether or not it is necessary to determine the dimensional weight of a carton in order for the shipping system to determine a proper shipping charge.

Because the measuring system 30 of the present invention has a relatively coarse resolution, i.e., the emitter/sensor units 40 are typically spaced at least two inches apart, it is necessary for the dimensional weighing apparatus 10 to calculate two different actual volumes for a carton in order to determine whether an appropriately calculated volume of the carton is over, under or at the predetermine threshold volume. This is accomplished by the CPU 74 determining a first actual volume V1 from the linear dimensions stored in the memory storage device 66 in a manner more fully described below in connection with the description of operation of the apparatus 10. This volume is put into a temporary memory in the CPU 74. The CPU 74 then calculates a second actual volume V2 by subtracting one unit space from each of the dimensions stored in the memory storage device 66 to determine a second actual volume V2 in the same manner as the volume V1, and this actual volume is also put into the temporary memory in the CPU 74.

The CPU 74 then compares the actual volumes V1 and V2 with the predetermined threshold volume stored in the memory storage device 52 to determine the relative size of both volumes to the predetermined threshold volume. If both actual volumes V1 and V2 are less than the predetermined threshold volume, the CPU 74 energizes the green light 86 to indicate to the operator that it is not necessary to proceed further to determine a dimensional weight for the carton since an appropriate shipping charge can be based on the actual weight as determined by the scale 20. If, on the other hand, the CPU 74 determines either that both actual volumes V1 and V2 are greater than the predetermined threshold volume, or that the V1 volume (the greater of the two volumes) is greater but the V2 volume is less than the predetermined threshold volume, then the CPU 74 does not energize any light on the indicating device 82, thereby indicating to the operator that it is necessary to proceed further with determining the dimensional weight of the carton, because in this situation it may be necessary to base an appropriate shipping charge on the dimensional weight rather than actual weight, depending on the result of a comparison between the dimensional weight and the actual weight, as determined next.

The CPU 74 then calculates the dimensional weight for each of the actual volumes V1 and V2, and these dimensional weights are stored in a temporary memory in the CPU 74 as DW1 and DW2. The CPU 74 then compares both dimensional weights DW1 and DW2 to the actual weight of the carton as determined by the scale 20. If both dimensional weights DW1 and DW2 are less than the actual weight, the CPU 74 energizes the green light 86 to indicate to the operator that the carton is sufficiently heavy in comparison to its size that it need not be accurately dimensionally weighed, and that the actual weight can be used by the shipping system 80 to determine a proper shipping charge. If, on the other hand, both dimensional weights DW1 and DW2 are greater than the actual weight, the CPU 74 energizes the red light 84 to indicate that the carton is too light in comparison to its size and that it must be accurately dimensionally weighed in order for the shipping system 80 to be able to determine a proper shipping charge therefor. Finally, if the first dimensional weight DW1 is larger than the actual weight and the second dimensional weight DW2 is less than the actual weight, the CPU 74 energizes the yellow light 88 to indicate that the carton is in the discretionary region where the operator may choose to dimensionally weigh the carton or not at his risk. Thus, at this point, the operator has the choice of accepting the measurement of the computer processing means 50, which may be the larger dimensional weight DW1, the smaller dimensional weight DW2, or an average of the two, depending on the manner in which the CPU 74 is programmed, and this dimensional weight is transmitted to the shipping system 80 as the shipping weight on which the appropriate shipping charge will be determined. Alternatively, the operator can elect to manually take the appropriate measurements for the carton from the measuring scales 39 on each of the measuring arms 32, 34 and 36 and calculate both exact volume and dimensional weight data to determine a precise dimensional weight of the carton for entry into the shipping system 80.

The indicating device 82 is connected to the CPU 74 via the line 90 so that the appropriate light 84, 86 or 88 is energized by the CPU after it compares the actual volumes V1 and V2 of a carton with the predetermined threshold volume stored in the memory storage device 52. The computer processing means 50 also includes a suitable manual control, which, for purposes of illustration, is the push button 92 which is connected to the CPU 74 by the line 94. The function of this control is to cause the CPU 74 to continue its processing function after it determines that the actual volumes V1 and V2 of the carton are above the predetermined threshold volume and therefore has not energized any light on the indicating device 82, and assuming that the operator has elected to accept the rough calculations of the V1 and V2 volumes of the computer processing means 50 rather than manually measuring the dimensions against the measuring scales 39. This causes the CPU 74 to calculate the dimensional weights DW1 and DW2 of the carton and to compare these dimensional weights with the actual weight as determined by the scale 20 to determine the appropriate shipping weight that will be sent to the shipping system 80, depending on the manner in which the CPU 74 is programmed to select V1, V2 or an average of the two. A further push button 96 is also connected via a line 98 to the CPU 74 for the purpose of causing the CPU 74 to complete its processing function if the CPU 74 determines that both dimensional weights DW1 and DW2 are greater than the actual weight and therefore has energized the red light 84 to indicate that the carton must be dimensionally weighed, and again assuming that the operator has elected to accept the approximate dimensional weights provided by the computer processing means 50 rather than manually calculating a dimensional weight from the more accurate actual volume he may have determined from manually measuring the dimensions of the carton.

The operation of the apparatus thus far described is as follows: During a set up phase of the dimensional weighing apparatus 10, the computer processing means 50 is set so as to place a minimum or threshold volume into the first memory storage device 52. For the purpose of illustration in the following description of operation, this volume will be considered to be 1728 cubic inches, or one cubic foot. It should be understood that this volume does not necessarily literally mean a uniform cubic foot, i.e., a carton that is 12"×12" by 12", but rather any combination of length, width multiplied together, equals 1728 cubic inches.

During operation, a carton C (FIG. 1) is placed on the scale platform 24 with the rear and side edges respectively of the carton C flush against the upstanding guide rails 26, thereby positioning the carton C in the proper predetermined location for both weighing by the scale 20 and measuring by the measuring arms 32, 34 and 36 in conjunction with the optical measuring means described above. The actual weight of the carton is determined by the scale 20, which for the purpose of this illustration, is assumed to be 10 pounds, and this weight is transferred to the CPU 74 as above described. The pulse generator 54 is energized in a suitable manner when the carton C is placed on the scale, or it may be continuously operating, to energize the emitter components 41 of the emitter/sensor units 40 in rapid succession.

Again, for the purpose of illustration, it is assumed that the carton C actually measures 12 inches along the measuring arm 32, 14 inches along the measuring arm 34 and 8 inches along the measuring arm 36. If the emitter/sensor units 40 are evenly spaced two inches apart, it is apparent that the first 6 units 40 on the measuring arm 32 will be adjacent to a side of the carton C, the first 7 units 40 on the measuring arm 34 will be adjacent to a side of the carton C, and the first 4 units 40 on the measuring arm 36 will be adjacent to a side of the carton C. It should be understood that the emitter/sensor units 40 may be spaced apart by a considerably greater distance in the apparatus disclosed herein than in the apparatus disclosed in the aforementioned cross-referenced application since this apparatus is not intended to have as fine a resolution for determining the linear measurement as the previous apparatus, and consequently is not intended to have the same degree of accuracy in determining the volume of a carton. As previously mentioned, the optical sensing system consists of relatively expensive components, with the result that the greater the resolution of the measuring system and the accuracy of the carton volume determination, the more expensive is the dimensional weighing apparatus. Thus, the apparatus of this invention is intended to provide electronically only an acceptably close approximation of the actual dimensions of a carton and therefore only an acceptably close approximation of the actual volume thereof.

In actual practice, the CPU 74 has been programmed to round off the linear dimensions of the length, width and height of a carton if the measuring system 30 determines that any of these dimensions include fractional parts of an inch. Although the practice is not universal, most carriers will round to the next higher inch; some will round up or down to the nearest inch; and an occasional carrier will round to the next lower inch.

The CPU 74 then performs a series of arithmetic calculations. Firstly, it receives the linear dimensions from the memory storage unit 66 and calculates the first actual volume V1 of the carton, which, in the illustration given, would equal 1344 equal 1344 cubic inches, and stores this figure in a memory in the CPU 74. The CPU 74 then subtracts one unit space, or two inches, from each of the dimensions stored in the memory storage unit 66 and calculates the second actual volume V2, which, in the illustration given, would equal 720 cubic inches. The CPU 74 then compares these volumes against the predetermined threshold volume stored in the memory storage unit 52, and determines that they are both considerably less than the predetermined threshold volume of 1728 cubic inches. The CPU 74 then activates the indicating device 82 by energizing the green light 86 to provide the operator with an indication that both calculated actual volumes V1 and V2 are well below the predetermined threshold volume, and determines that the actual weight for the carton as determined by the scale 20, i.e., 10 pounds, can be used as the appropriate shipping weight. The CPU 74 also sends a signal to the shipping system 80 via the lines 76 and 78 which is indicative of the actual weight of the carton so that the shipping system 80 can determine the appropriate shipping charge.

If, on the other hand, a carton C is placed on the scale platform 24 which still weighs only 10 pounds, but the linear dimensions of this carton are, for example, 15 inches on the measuring arm 32, 23 inches on the measuring arm 34 and 11 inches on the measuring arm 36, the same procedure as described above would occur, except that the calculated actual volumes V1 and V2 of the carton would now be 3795 and 2457 cubic inches respectively, both of which are far in excess of the predetermined threshold volume of 1728 cubic inches. The CPU 74 responds to this situation by not energizing any light on the indicating device 82, which, as mentioned above, indicates to the operator that a dimensional weight, either approximate or precise at the election of the operation, should be determined in order for the shipping system 80 to determine a proper shipping charge.

The computer processing means 50 includes means which causes it to terminate operation to afford the operator an opportunity to decide whether he should manually measure the carton C against the measuring scales 39 on the measuring arms 32, 34 and 36, or alternatively use some other method for determining the carton dimensions, in order to obtain accurate measurements from which he can calculate an accurate actual volume of the carton, from which he can further obtain an accurate dimensional weight by dividing the actual volume by the dimensional weight constant. This procedure ensures the operator that he is determining the appropriate shipping weight with the greatest possible accuracy which ensures that his determination of a shipping charge for that shipping weight will be in accord with the shipping charge that a carrier would determine. This, of course, is a relatively slow procedure since it requires the intervention of manual activities, including the use of a calculator and rate charts. Thus, the price of accuracy is a slow throughput rate if many cartons are involved at a particular time.

The operator can, however, sacrifice accuracy in the interest of speed and a high throughput rate by electing to press the push button 92, or activate whatever other control may be provided, which reactivates the computer processing means 50 and causes the CPU 74 to continue the process described above for calculating the dimensional weights DW1 and DW2 and comparing them against the actual weight to determine whether these dimensional weights are greater or less than the actual weight, or DW1 is greater and DW2 is less that the actual weight. Thus, the CPU 74 determines the dimensional weights DW1 and DW2 by dividing the calculated actual volumes V1 and V2 by the dimensional constant stored in the memory storage unit 53, which in the example is assumed to be the domestic shipping standard of 194 cubic inches per pound, and determines DW1 and DW2 to be 19.56 pounds and 12.66 pounds respectively. The CPU 74 then compares these dimensional weights to the actual weight of the carton as determined by the scale 20, i.e., 10 pounds, to determine the status of the dimensional weights to the actual weight. In the example given, both dimensional weights DW1 and DW2 are larger than the actual weight, and the CPU 74 activates the indicating device 82 by energizing the red light 84, thereby indicating again that the carton must be dimensionally weighed in order to obtain a proper shipping weight and again terminating operation of the computer processing means. Again the operator can make an election to accept the rough calculations of the computer processing means 50 of the dimensional weights DW1 and DW2 and, by pressing the push button 96, again reactivates the computer processing means 50 to cause the CPU 74 to send a signal to the shipping system 80 that is indicative of the shipping weight based on the manner in which the CPU 74 is programmed to select either DW1 or DW2, or an average of the two. Alternatively, the operator can elect to proceed with the manual determination of accurate dimensions, volumes and dimensional weights as described above.

If, on the other hand, the actual weight of this carton had been 15 pounds, which is between the DW1 of 19.56 pounds and the DW2 of 12.66 pounds, the CPU 74 would activate the indicating device 82 by energizing the yellow light 86, at which point the operator can make an election either to accept the actual weight of the carton as the shipping weight for the purpose of determining the shipping charge, or he can make a further election either to accept the rough calculations of the computer processing means 50 and of the dimensional weights DW1 and DW2 and, by pressing the push button 96, cause the CPU 74 to send a signal to the shipping system 80 that is indicative of the shipping weight based on the manner in which the CPU 74 is programmed to select either DW1 or DW2, or an average of the two, or to proceed with the manual determination of accurate dimensions, volumes and dimensional weights as described above.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

We claim:

1. Dimensional weighing apparatus adapted for use with a shipping system which determines an appropriate shipping charge for package and parcels based, among other factors, on an appropriate shipping weight as determined by said dimensional weighing apparatus, said dimensional weighing apparatus comprising:

(a) means defining a supporting surface;

(b) a weighing scale mounted on said supporting surface and having a platform on which cartons are placed for determining the actual weight of the cartons;

(c) a measuring frame operatively associate with said supporting surface;

(d) means operatively associated with said measuring frame for measuring the linear distance of the length, width and height of a carton placed on said platform; and (e) computer processing means responsive to operation of said weighing scale and said measuring means for determining whether the actual volume of the carton is greater or less than a predetermined threshold volume stored in a memory and for providing an indication thereof, said computer processing means further comprising:

(i) selectively operable means for determining a shipping weight of said carton by calculating the dimensional weight of the carton and for comparing said dimensional weight with said actual weight to determine which of said weights is the larger;

(ii) means for generating a first operator recognizable signal if said computer processing means determines that said actual volume of said carton is less than said predetermined threshold volume stored in said memory; and (iii) means for generating a second operator recognizable signal if said computer processing means determines that said actual volume of said carton is greater than said predetermined threshold volume.

2. Dimensional weighing apparatus as set forth in claim 1, wherein said weighing scale includes means defining a reference point for cartons disposed on said platform for positioning cartons in a predetermined location on said platform relative to said measuring frame such that the surfaces of the cartons adjacent the measuring frame are disposed in spaced relationship therewith.

3. Dimensional weighing apparatus as set forth in claim 2, wherein said means defining said reference point comprises guide means mounted on said platform in spaced parallel relationship with said measuring arms for ensuring that said surfaces of a carton disposed on said platform in said relationship with said measuring arms.

4. Dimensional weighing apparatus as set forth in claim 3, wherein said measuring frame includes a plurality of elongate measuring arms extending from a juncture of said measuring arms disposed adjacent said reference point along the two horizontal axes of cartons and the vertical axis thereof, said juncture of said measuring arms being disposed in closely spaced relationship with said reference point.

5. Dimensional weighing apparatus as set forth in claim 4, wherein said measuring arms include a linear scale extending along the length thereof from which an operator can manually measure the dimensions of a carton on said platform and calculate the actual volume of the carton therefrom.

6. Dimensional weighing apparatus as set forth in claim 4, wherein said means for measuring the linear distance of the length, width and height of a carton disposed on said platform comprises optical sensing means associated with each of said measuring arms for determining the extent to which each of said adjacent surfaces of a carton disposed on said platform in said predetermined location extends along the adjacent measuring arm.

7. Dimensional weighing apparatus as set forth in claim 1, wherein said optical sensing means comprises a plurality of optical emitter/sensor units mounted on said measuring arms in evenly spaced relationship therealong, said emitter/sensor units being capable of determining whether or not a surface or an edge of a carton is disposed adjacent to said emitter/sensor units.

8. Dimensional weighing apparatus as set forth in claim 7, wherein said optical sensing means further includes:

(a) control means for sequentially energizing said optical emitter/sensor units in rapid succession from one end of said measuring arms to the other; and (b) means responsive to said emitter/sensor units sensing the first emitter/sensor unit at which the adjacent surface or edge of a carton begins or ends, as the case may be, depending upon which direction along said measuring arms said emitter/sensor units are sequentially energized, for determining the remaining number of emitter/sensor units along each measuring arm, thereby providing an indication of the linear distance that the adjacent surface or edge of the carton extends along said measuring arms from said reference point.

9. Dimensional weighing apparatus as set forth in claim 1, wherein said computer processing means includes means for terminating operation thereof if said computer processing means determines that said actual volume of said carton is greater than said predetermined threshold volume and generates said second signal.

10. Dimensional weighing apparatus as set forth in claim 9, wherein said selectively operable means comprises manually operable means for actuating said computer processing means to determine a dimensional weight of said carton if said computer processing means determines that said actual volume of said carton is greater than said predetermined threshold volume.

11. Dimensional weighing apparatus as set forth in claim 10, wherein said means for determining whether or not said actual volume of said carton exceeds said predetermined threshold volume comprises:

(a) memory storage means for storing said predetermined threshold volume threshold volume;

(b) memory storage means for storing the individual linear dimensions of the length, width and height of said carton disposed on said platform:

(c) means for calculating the volume of said carton based on said linear dimensions; and (d) means for comparing the calculated volume of the carton with said predetermined threshold volume to determine which is the larger.

12. Dimensional weighing apparatus as set forth in claim 10, wherein said computer processing means for determining said dimensional weight of said carton comprises means for converting said actual volume of said carton into said dimensional weight and for comparing said dimensional weight with said actual weight to determine which is the larger.

13. Dimensional weighing apparatus as set forth in claim 12, wherein said means for converting the actual volume of a carton into dimensional weight thereof and for comparing the dimensional weight with the actual weight comprises:

(a) calculating means responsive to operation of said measuring means for calculating said actual volume of the carton;

(b) memory storage means for storing a dimensional weight constant in terms of cubic units per unit of weight;

(c) means for calculating a dimensional weight by dividing the actual volume of the carton by said dimensional weight constant; and (d) means for comparing said actual weight of the carton with said dimensional weight thereof to determine which is the larger.

14. Dimensional weighing apparatus as set forth in claim 12, wherein said computer processing means includes means for terminating operation thereof if said computer processing means determines that said dimensional weight is greater than said actual weight and for generating a third operator recognizable signal to indicate said condition.

15. Dimensional weighing apparatus as set forth in claim 14, wherein said selectively operable means comprises a second manually operable means for reactivating said computer processing means to cause said computer processing means to determine that said dimensional weight is the appropriate shipping weight for said carton.

16. Dimensional weighing apparatus as set forth in claim 1, wherein said computer processing means for determining whether said actual volume of said carton is greater or less than said predetermined threshold volume stored in said memory comprises means for calculating two different actual volumes for said carton and for storing each in a memory in said computer processing means.

17. Dimensional weighing apparatus as set forth in claim 16, wherein said means for calculating said two separate volumes comprises means responsive to operation of said measuring means for determining a first actual volume of said carton based on the dimensions thereof as determined by said measuring means, for then subtracting a single predetermined unit of linear distance from the measured distance of each of the length, width and height dimensions, and for calculating a second actual volume of said carton based on said reduced dimensions.

18. Dimensional weighing apparatus as set forth in claim 17, wherein said computer processing means for determining a shipping weight of said carton comprises means for determining two dimensional weights of said carton from each of said actual volumes and comparing each of said dimensional weights with the corresponding one of said actual weights to determine whether both of said dimensional weights are greater or less than said actual weight, or one dimensional weight is greater and one dimensional weight is less than said actual weight.

19. Dimensional weighing apparatus as set forth in claim 18, wherein said computer processing means for determining said shipping weight of said carton further comprises programmable means for selecting the higher or the lower of said dimensional weights, or an average of the two, for comparing with said actual weight to determine said shipping weight, depending on the manner in which said computer processing means is programmed.

* * * * *